United States Patent
McBurney (10) Patent No.: US 6,683,564 B1
(45) Date of Patent: Jan. 27, 2004

(54) HIGH-SENSITIVITY SATELLITE POSITIONING SYSTEM RECEIVERS AND RECEPTION METHODS

(75) Inventor: Paul W. McBurney, San Francisco, CA (US)

(73) Assignees: eRide, Inc., San Francisco, CA (US); Seiko Epson Corporation, Tokyo (JP)

(*) Notice: Subject to any disclaimer, the term of this patent is extended or adjusted under 35 U.S.C. 154(b) by 0 days.

(21) Appl. No.: 10/300,501

(22) Filed: Nov. 19, 2002

(51) Int. Cl.[7] .............................. G01S 5/02; H04B 7/185
(52) U.S. Cl. ............................. 342/357.02; 342/357.06; 342/357.1; 701/214
(58) Field of Search .................. 342/357.02, 357.04, 342/357.06, 357.1; 701/214

(56) References Cited

U.S. PATENT DOCUMENTS 6,473,694 B1 * 10/2002 Akopian et al. ............ 701/213

* cited by examiner

Primary Examiner—Theodore M. Blum (57) ABSTRACT

A navigation satellite receiver method determines what navData is on-hand, what level of time uncertainty exists, and what position uncertainty there is for the receiver at turn-on. Indoor and outdoor search engines are used that can vary their search windows and dwell times to increase receiver sensitivity. Received signals are stored in several playback loops that can be operated in parallel to increase search sensitivity in the face of large uncertainties in time ad frequency, and still reduce the time-to-first-fix. Satellite acquisition can be achieved even when the navData is too weak to be read by requesting help from a server.

24 Claims, 4 Drawing Sheets

HIGH-SENSITIVITY SATELLITE POSITIONING SYSTEM RECEIVERS AND RECEPTION METHODS

FIELD OF THE INVENTION

The present invention, relates to navigation satellite receivers, and more particularly to methods and systems for operating navigation satellite receivers in faint signal-level environments.

DESCRIPTION OF THE PRIOR ART

The global positioning system (GPS) is a satellite-based radio-navigation system built and operated by the United States Department of Defense at a cost of over $13 billion. Satellite positioning systems (SPS) include GPS and the Russian GLONASS navigation system. Others are proposed by Japan and the European Union.

In the GPS system, twenty-four satellites circling the earth at an attitude of 20,200 km are spaced in orbit such that a minimum of six satellites are in view at any one time to a user. Each such satellite transmits an accurate time and position signal. GPS receivers measure the time delay for the signal to reach it, and the apparent receiver-satellite distance is calculated from that. Measurements like this from at least four satellites allow a GPS receiver to calculate its three-dimensional position, velocity, and system time.

A navigation satellite receiver that has just been turned on does not yet know the exact orbital positions of satellites that are visible to it, where the receiver itself is, how much its crystal oscillator is in error and therefore its tuning frequencies, nor what time it is. It may however, know time to within a few seconds or better, and its rough position to within a hundred kilometers. Such prior knowledge, even so rough as this, can be used to great advantage.

The exact system time and the apparent carrier frequencies from the satellites are needed by the receiver to find and lock onto the transmissions, and so initially a search is usually needed of all the possibilities. Reducing the range of possibilities leads directly to quicker initializations. It is a commercial necessity for manufacturers of such equipment that the first position fix be well within the limited patience of the typical user.

A GPS receiver that is associated with a cellphone or that can communicate over the Internet can be assisted in many ways by network servers connected to other GPS receivers that already have satellite-lock and are tracking. A telephone or network communication channel can be used to contribute key bits of information to a navigation satellite receiver to help it initialize faster. One of the present inventors, Paul McBurney, and others, have recently filed several U.S. patent applications that relate to aiding GPS receiver clients. These are summarized in Table I, and all such patent applications have been assigned to the same Assignee, and are incorporated herein by reference.

TABLE I

| Docket Number | Title | Inventors | USPTO Filing Date | USPTO Serial No. |
| --- | --- | --- | --- | --- |
| 734-01 | Satellite Navigation satellite receiver and Method of | P. McBurney, A. Woo | Oct. 11, 2000 | 09/687,044 |
| 734-02 | Infrastructure-Aiding for Satellite Navigation satellite receiver and Method | P. McBurney, A. Woo | Feb. 28, 2001 | 09/797,521 |
| 734-03 | High sensitivity GPS Receiver and Reception | P. McBurney, A. Woo | Feb. 19, 2002 | 10/079,245 |
| 734-04 | Total Correction Strategy | Stephen J, Edwards, P. McBurney | Feb. 19, 2002 | 10/079,217 |
| 734-05 | Method and System for Position Calculation from Calculated Time | S. Edwards, P. McBurney | Feb. 19, 2002 | 10/079,244 |
| 734-06 | Computing Network Path Delays so Accurate Absolute Time can be Forwarded from a Server to a Client | H. Matsushita, P. McBurney | Feb. 19, 2002 | 10/079,251 |
| 734-07 | No Preamble Frame Sync | Akira Kimura, P. McBurney | Feb. 19, 2002 | 10/079,250 |
| 734-08 | Thin Client | P. McBurney, C. Rasmussen, F. Vaucher, K. Victa | Feb. 19, 2002 | 10/079,249 |
| 734-09 | Software Crystal Oscillator | H. Matsushita, P. McBurney | Feb. 19, 2002 | 10/079,248 |
| 734-10 | High Sensitivity Infrequent Use of Sensors | P. McBurney, K. Victa | Feb. 19, 2002 | 10/079,247 |
| 734-11 | Real Time Clock (RTC) | P. McBurney | Feb. 19, 2002 | 10/079,253 |
| 734-12 | Shared Reference Station | C. Rypinski, M. Junkar | Feb. 19, 2002 | 10/079,252 |
| 734-13 | Client-Aided Doppler Estimation | P. McBurney, W. J. Morrison | Aug. 7, 2002 | 10/215,138 |
| 734-15 | Synthetic Nav-Data For A High-Sensitivity Satellite Positioning System Receiver | P. McBurney, W. J. Morrison | not yet filed | |

The GPS satellites transmit a 50-bps navigation (NAV) data message that repeats every 12.5 minutes. It comprises system time, satellite ephemeris, and almanac information that is critical to a GPS receiver in acquiring signal lock on enough satellites and producing its navigation solutions. There are twenty-five frames that each take 30-seconds, each frame has five subframes, and each subframe has ten words. A Z-count at the beginning of each subframe gives its transmission time from the satellite. Ephemeris is the first three subframes, and subframes 4–5 are almanac data spread over fifty pages. One whole data frame of NAV data is 1500-bits long, and thus takes thirty seconds to transmit.

The NAV-data cannot be reliably received and demodulated if its signal level is too weak. Such can occur indoors or below decks. So high sensitivity receivers need informational assistance from a third party over a different channel to get the current NAV-data. If local-receiver system-time is known, the z-count information can be plugged into an otherwise generic NAV-data message obtained from such third party.

Each data frame is divided into five subframes 1–5, and each subframe is 300-bits long, e.g., ten 30-bit words. Thus it takes six seconds to transmit each 300-bit, 10-word subframe. Every subframe starts with a telemetry (TLM) word of 30-bits, followed by a hand-over word (HOW) of 30-bits. Both 30-bit words comprise 24-bits of data and 6-bits of parity. There are eight words of data payload in each subframe.

The TLM word at the front of each 300-bit subframe begins with an 8-bit preamble. The preamble allows the start of a subframe to be recognized, and thereafter provides a primary mechanism for the receiver to be synchronized.

The first 300-bit subframe transmits the satellite vehicle (SV) clock correction data after the TLM word and HOW. The second subframe transmits the first part of the satellite vehicle-ephemeris data. The third subframe transmits the second part of the satellite vehicle-ephemeris data. Subframes four and five are used to transmit different pages of system data. The fourth subframe also begins with the TLM word and HOW, and the data payloads rotate over 12.5 minutes to transmit the lengthy information about the ionosphere, UTC, and other data. An entire set of twenty-five frames, e.g., 125 subframes, makes up the complete Navigation Message that is sent over such 12.5 minute period. The fifth subframe begins with the TLM word and HOW, and its data payload also rotates over 12.5 minutes to transmit the rather-large almanac.

The clock data parameters describe the satellite vehicle-clock and its relationship to GPS time. The ephemeris data parameters describe satellite vehicle-orbits for short sections of the satellite orbits. Normally, a receiver gathers new ephemeris data each hour, but it can use old data for up to four hours without much error. The ephemeris parameters are used with an algorithm that computes the satellite vehicle position for any time within the period of the orbit described by the ephemeris parameter set. The almanacs are approximate orbital data parameters for all satellite vehicle's. The ten-parameter almanacs describe satellite vehicle orbits over extended periods of time, and is sometimes useful for months.

The signal-acquisition time of a GPS receiver at start-up can be significantly speeded by having the current almanac available. The approximate orbital data is used to preset the receiver with the approximate position and carrier Doppler frequency of each satellite vehicle in the constellation.

Norman F. Krasner describes a way to deal with NAV-data messages that cannot be read because the carrier signal levels are too weak, in METHOD AND APPARATUS FOR SATELLITE POSITIONING SYSTEM BASED ON TIME MEASUREMENT, U.S. Pat. No. 6,239,742 B1, issued May 29, 2001. A base station is used to record parts of the NAV-data message and these are compared to similar data from a remote SPS receiver. The remote SPS receiver receives parts of the NAV-data message directly from satellites visible to it. The NAV-data recorded by the base station includes with it correct time identification, so matching up the two overlapping-in-time parts can assist the remote SPS receiver in finding its correct system time. Such comparison is not done at the remote mobile receiver, but rather back at the base station.

SUMMARY OF THE INVENTION

It is therefore an object of the present invention to provide a method and system for assisting navigation satellite reception and receiver initialization.

It is another object of the present invention to provide a method and system for reducing the time necessary for GPS and SPS receivers to initialize.

It is a further object of the present invention to provide a satellite-navigation system that is cost effective.

Briefly, a navigation satellite receiver method embodiment of the present invention determines what navData is on-hand, what level of time uncertainty exists, and what position uncertainty there is for the receiver at turn-on. Indoor and outdoor search engines are used that can vary their search windows and dwell times to increase receiver sensitivity. Received signals are stored in several playback loops that can be operated in parallel to increase search sensitivity in the face of large uncertainties in time and frequency, and still reduce the time-to-first-fix. Satellite acquisition can be achieved even when the navData is too weak to be read by requesting help from a server.

An advantage of the present invention is that a system and method is provided that provides for initialization of navigation satellite receivers in attenuated signal attenuation levels that would otherwise not be able to initialize.

Another advantage of the present invention is that a system and method is provided for reducing the cost navigation satellite receivers associated with mobile cellular telephones.

These and other objects and advantages of the present invention will no doubt become obvious to those of ordinary skill in the art after having read the following detailed description of the preferred SPS receivers which are illustrated in the various drawing figures.

DETAILED DESCRIPTION OF THE PREFERRED EMBODIMENT

Figure 1:
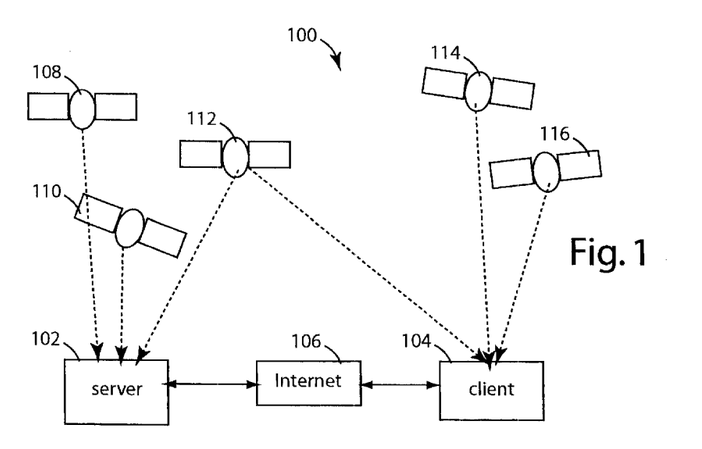
FIG. 1 is a functional block diagram of a networked navigation system embodiment of the present invention.

FIG. 1 illustrates a networked navigation system 100, in an embodiment of the present invention, that includes a reference-station server system 102, a GPS measurement platform 104, and an intervening computer network 106 such as the Internet. The server system 102 includes a navigation satellite receiver that has locked onto and is tracking a constellation of navigation satellite vehicles (SV's) 108, 110, and 112. Some of these may also be visible to the GPS measurement platform 104. Another constellation of navigation satellites, including 114 and 116 is visible to client system 104. The GPS measurement platform 104 includes its own navigation satellite receiver, but such may not have yet locked onto and be tracking its constellation of navigation satellites 112, 114, and 116.

A navigation satellite receiver method embodiment of the present invention determines what navData is on-hand, what level of time uncertainty exists, and what position uncertainty there is for the receiver at turn-on. Indoor and outdoor search engines are used that can vary their search windows and dwell times to increase receiver sensitivity. Received signals are stored in several playback loops that can be operated in parallel to increase search sensitivity in the face of large uncertainties in time and frequency, and still reduce the time-to-first-fix. Satellite acquisition can be achieved even when the navData is too weak to be read by requesting help from a server.

In general, there are four types of GPS measurement platform embodiments of the present invention that are categorized by how independent of the server they can operate. An autonomous client can function and provide navigation solutions to a user with only minimal help from the server 102, e.g., differential correction data. A demi-client needs more help, e.g., polynomial models that simplify ephemeris and time bias calculations. A thin-client lays off just about all the navigation calculations on the server 102, and basically provides only observational measurements from its point of view of the SV constellation. The navigation solutions are returned for local display if a user is there and wants to see them. The fourth type of client is a high-sensitivity GPS receiver connected as client 104, herein referred to as OMNI.

Figure 2:
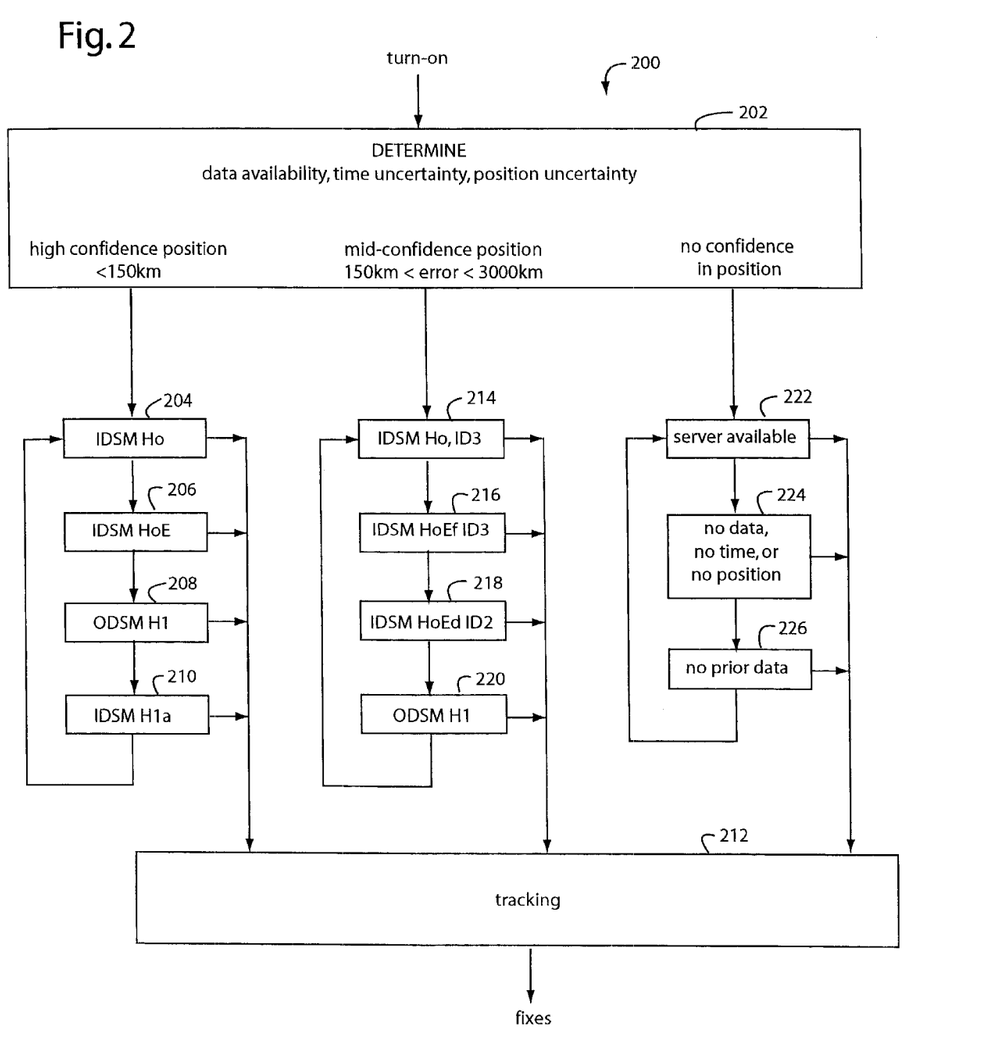
FIG. 2 is a flowchart diagram of a method embodiment of the present invention useful in the system of FIG. 1.

FIG. 2 represents a search method embodiment of the present invention for acquiring and tracking navigation satellites with a receiver, and is referred to herein by the general reference numeral 200. Many of the techniques and terms used here in the following discussion that are not a part of the general skill of artisans in the field are explained in detail in the several U.S. patent applications incorporated herein by reference.

The method 200 begins with a navigation receiver being turned on. A step 202 determines what data is available, what gross time-uncertainty (sigmaTime) exists, and what gross position-uncertainty (sigmaPos) there is about the present location of the receiver. The data referred to in step 202 includes almanac and ephemeris information on the satellite vehicles (SV's). The data availability depends on whether a server can be connected to and how recent is any stored data.

Data source quality falls into a few grades:
a. a current ephemeris for all SV's is the best case and occurs when communication can be had with a server that has world wide coverage. After such an update, the receiver can run autonomous for 4–6 hours. Such data allows the highest elevation satellites (high-N) to be computed since the ephemeris acts like an almanac;
b. a current ephemeris for some SV's and down-moded ephemeris for others occurs in a receiver that has tracked recently and stored other ephemeredes from a previous server session or tracking session. Such can be used as long as 4–6 hours later to form the high-N and predict Dopplers;
c. no current ephemeris but still a complete almanac allows acquisition but not fixing because there is insufficient SV position and clock accuracy. If outdoors, a new ephemeris can be collected without using a server; and
d. no data occurs in clients after startup and before communicating with a server, and also in a general cold start.

There are a few different levels of time uncertainty (sigmaTime):
a. within 1-msec is possible with a real time clock (RTC) that has been running uncorrected for less than a day;
b. a measured z-count decoded from navData or pattern match can reduce any time uncertainty to 10-msec, which is good enough to converge the position solution without U-dot V-DT terms;
c. within 20-msec is possible with a real time clock (RTC) that has been running uncorrected for a few days to a week, and this is generally good enough to avoid a no-Z fix;
d. a network latency estimate and using a server as a time base can reduce sigmaTime to 20-msec to 50-msec, and that would allow the no-Z fix and use of the classic fix type;
e. with sigmaTime in the one second level, big DT estimates larger than one second can be disqualified in a no-Z fix for increased integrity;
f. a rough time input from a human or a poor RTC accurate to five minutes is good enough to pick the high-N SV's and get a reasonable Doppler, and so this is good enough to start a search but a z-count, pattern match or latency source is needed to start the fix; and
g. no-time information available at all is the default for reference station start ups and other cold starts.

The bit transition time (BTT) is an estimate of the sub-twenty-millisecond portion of the integer millisecond. It can be used to filter the integer millisecond computed with pattern match or as an independent verifier. The z-count and BTT are measured by collecting NAV-data. The BTT is used to clean-up codephase roll-overs. Generally, the sub-twenty-millisecond portion should agree. There is a bit more noise on the BTT than z-count. However, the z-count can be in error by one millisecond for a short period of time near where the codephase rolls over.

There are three levels of position uncertainty (sigmaPos):
a. Less than 150-km, where a fix can be had even without a bit transition time (BTT) or a Z-count on each SV;
b. More than 150-km but less 3000-km, where some improvement can be realized by predicting the expected Doppler of the high-N SV's; and
c. More than 3000-km, where the high-N and expected Doppler information is so poor that it is better to assume no position.

The 150-km threshold is a result of the physical distance the microwave transmission from a GPS-satellite travels during the time it takes to complete one whole C/A-code sequence. If the user position is known to better than 150-km uncertainty, then there will be no codephase integer ambiguity. But if the user position is not known to better than 150-km uncertainty, then the integer ambiguity problem must be solved. As a result, this 150-km threshold is highly dependent on the length of the pseudo-random number (PRN) code length and its repetition period or chip-rate. The GPS-system C/A-code repeats every millisecond, but the precision code (P-code) has a much longer length and practically no integer ambiguity problem. Other navigation satellite systems, e.g., the Russian GLONASS-system, will have different thresholds.

The 3000-km threshold is a result of the Doppler effects of moving GPS-satellites. If the position uncertainty is known to be better than 3000-km, then a Doppler estimate based on that can be helpful. But if the position uncertainty is not known to be better than 3000-km, then a Doppler estimate based on that level of uncertainty can be detrimental. The 3000-km threshold is therefore characteristic of the GPS-system and its satellites. Other systems and applications will probably have different thresholds that are appropriate.

If the position uncertainty is less than 150-km, a fix can be obtained without a z-count. A gridFix method can be used when the position uncertainty is under 150-km and the integer millisecond (intMs) on SV's is not available. A no-Z fix type is preferably used when sigmaTime is greater than 10-msec.

The signal-to-noise ratio (SNR) quality of the received signals from the SV's can vary for each SV. Five levels of SNR are defined, outdoor (OD) and four grades of indoor (ID1–ID4).

The third indoor signal attenuation level (ID3) exists for SNR's between −155 dBm and −150 dBm. Satellite vehicle acquisition is made with the indoor search method, with a handoff to track in TSM to carrier loop four carrier from indoor search method, DLL runs). Such can obtain BTT and some pattern matching, but generally the signals are too weak to reliably collect the navData.

The fourth indoor signal attenuation level (ID4) is defined for SNR's weaker than −150 dBm, and is tantamount to total signal obstruction. Satellite vehicle acquisition and tracking is next to impossible with signals this faint.

SPS receivers of the present invention described herein therefore extend the useful range of signal strengths for SPS receivers down to −150 dBm.

Not all the satellite vehicles visible at any one time will necessarily fit into one of the five signal attenuation level categories, e.g., OD and ID1–ID4. But if outdoors with no obstructions, as like a reference station, then all satellite vehicles above a few degrees of elevation will probably fit the outdoor signal attenuation level model. Conversely, if the receiver is really deep indoors, then the signals from all the satellite vehicles may be in the obstructed ID4 group. More typically, the SNR environments will be mixed.

For example when the receiver is operating in a deep canyon, there can be a combination of direct satellite

TABLE

Signal Attenuation Levels

| | ACQUIRE | TRACK | COMMENT |
|---|---|---|---|
| OD:<br>SNR ≥ −142 dBm | outdoor search method (ODSM) | time track state machine (TSM) | reliable navData |
| ID1:<br>−145 dbm </= SNR < −142 dBm | indoor search method (IDSM) | handoff to track in TSM | navData in TSM possible some ephemeris, z-count, and BTT |
| ID2:<br>−150 dbm </= SNR < −145 dBm | indoor search method (IDSM) | Handoff to TSM to carrier loop 4 (carrier from indoor search method, DLL runs) | Can get BTT and some pattern matching, but too weak to collect NAV-data reliably |
| ID3:<br>−155 dBm </= SNR < −150 dBm | indoor search method (IDSM) | Too weak to handoff | no NAV-data, BTT, or z-count |
| ID4:<br>SNR < −155 dBm | cannot be acquired | cannot be tracked | completely obstructed |

The outdoor (OD) signal attenuation level exists where the receiver signal-to-noise ratio (SNR) is at least −142 dBm. Satellite vehicle acquisition is made with the outdoor search method defined herein, and tracking is done with the time track state machine (TSM). The indoor search method is not needed, and so the extra time and effort required of the receiver can be avoided. Such SNR's produce reliable navData, e.g., ephemeris, z-count, and BTT.

The first indoor signal attenuation level (ID1) exists for SNR's between −145 dBm and −142 dBm. Satellite vehicle acquisition is made with the indoor search method, with a handoff to track in TSM. The indoor search method is disabled after handshake to save power. Obtaining the navData in TSM is possible, e.g., some ephemeris, z-count, and BTT.

The second indoor signal attenuation level (ID2) exists for SNR's between −150 dBm and −145 dBm. Satellite vehicle acquisition is made with the indoor search method, with a handoff to track in TSM to carrier loop four carrier from indoor search method, DLL runs. Such can get BTT and some pattern matching, but generally the signals are too weak to reliably collect the navData.

vehicles (in OD), attenuated satellite vehicles (in ID1–ID3), and obstructed satellite vehicles (in ID4). In such an environment, the strong overhead satellite vehicles can cause adverse cross-correlations on the weak and obstructed satellite vehicles because of the narrowband indoor search. It is possible that the cross-correlation peak is stronger than the satellite vehicles being searching for. The outdoor search method (ODSM) is preferably used first. The ODSM bandwidth is wider and less sensitive. Cross-correlation is more likely as the frequency window grows. The best way to minimize such likelihood is to search the smallest frequency windows possible.

When inside a building, but above signal attenuation level ID4, it is possible some satellite vehicles will exhibit stronger received signal levels. But the likelihood of cross-correlation problems is reduced because there are really no direct satellite vehicles, even high-elevation satellite vehicles will experience some attenuation on the direct beam. The indoor search method works well in such environment.

Two basic hypotheses are possible, Ho: sigmaPos<150-km and small enough time error so that Dopplers are correct; and, H1: Ho is wrong.

Two search methods and engines are used in receiver embodiments of the present invention, an outdoor search method/engine (ODSM) and an indoor search method/engine (IDSM).

In the ODSM, four types of search hypotheses are used, Ho, Ho & H1, H1a, and H1na. The Ho high confidence single hypothesis uses a ±2 kHz frequency search, with high-8 only, Doppler and software-compensated crystal oscillator (SCXO) centered. It is tuned for highest sensitivity and uses the high-N satellites only.

For ODSM Ho&H1, there is still some confidence in H0, but H1 is also tried. It uses a ±2 kHz frequency search with high-8 Doppler and SCXO centered, tuned for medium sensitivity. It searches all twenty-four of the other SV's, the high-8, and uses a full ±4kHz spread among the launched and not-launched group words. The high-N can also be searched with the same wide frequency window without including these SV's in the other words. At least the high-N is tried first, but it is a waste of time to try them again.

For ODSM H1a, either the time or position is not known. The current launched SV's are known from the almanac. Information about the twenty-four SV's are spread among three group words. Some knowledge of orbit plane may be useful for optimal anywhere-search time.

The ODSM H1na is the same as ODSM H1a, but with no almanac available. This occurs in an autonomous client with no battery-backed memory.

Each of the search parameters can be tuned for higher sensitivity or faster time-to-completion.

The ODSM measurements are handed-off to the TSM for tracking. The OD mode can operate quite well in ODSM and TSM. There may be certain cases with mixed SNRs, weaker SV's are acquired in IDSM while tracking stronger SV's in TSM. Such is true for the general client.

In IDSM, six types of search hypotheses are used. The IDSM null-hypothesis (Ho) search is the normal IDSM with the smallest reasonable frequency window and the longest reasonable dwell. Such is generally used when good prior data is on-hand. The IDSM null-hypothesis extended frequency (HoEf) search extends the frequency window when the crystal uncertainty model has been too optimistic. The IDSM null-hypothesis extended dwell (HoEd) search extends the dwell because the attenuation level is more severe than was first anticipated and more receiver sensitivity is needed. The IDSM null-hypothesis extended frequency and dwell (HoEfd) search extends both the frequency and dwell. The IDSM null-hypothesis extended frequency and reduced dwell (HoEfRd) search increases the frequency range, but reduces the dwell when there is less confidence in the data or when not connecting to the server. Without the ephemeris, there is no value in searching with very long dwell since SV's cannot be used for which NAV-data cannot be collected.

The IDSM alternate hypothesis (H1) search is a backup for improving receiver sensitivity when the ODSM H1 search is not acquiring. A larger frequency window is used with a shorter dwell. For each factor of two reduction in dwell, the search can double the frequency window. For example, going from one second to 250-millisecond, 3 db is given up from −153 dbm to get to −150 dbm. A 4kHz window can be searched in the same time a 1 kHz window is searched with a one second dwell. Such is a natural level since this is the limit of where BTT can be found. However, we cannot also get NAV-data here. So reducing the dwell further to 80-millisecond, reaches to −148.5 dBm, and the extra factor of two can be used to search faster. The IDSM H1 search requires the client to monitor the IDSM status and determine when it has completed the window for all eight SV's. Another set of SV's must be submitted for slots that did not acquire, and repeated until all twenty-four or thirty-two SV's are completed.

In FIG. 2, if the sigmaPos is high confidence, e.g., better than 150-km, then a step 204 conducts an IDSM Ho. This is the correct path when ID1 through ID4 are true. If OD is true, we should be concerned about cross-correlation when we have at least one strong SV. ODSM would be better if OD is true, and thus faster to TSM. If there is no fix after a time-out and the data is trusted, then continue trying the same SV's at the current Doppler center. However, if the drift estimate is wrong, then increase the frequency window. If the model is wrong, the search may never find the SV's, so ODSM H1 is tried. If OD is true the search will recover, but not if indoor. All modes should try ODSM H1 at least one time after some time-out when there are no-SV's acquired. A strong SV with low elevation may indicate inclusion in the high-N set of SV's is wrong. Acquiring an SV that is not visible at the current position and time indicates the data is wrong. Such should precipitate an average SV position based on the ephemeris of a strong tracking SV.

In step 204, IDSM Ho is tried for a selected amount of time (Tsec) or cycles (Ncycles). If that is unsuccessful, then a step 206 tries IDSM HoE and increases drift uncertainty and/or dwell for Tsec or Ncycles. If that too is unsuccessful, then a step 208 tries ODSM H1 for Tsec or Ncycles. If that is unsuccessful, then a step 210 tries IDSM H1a and increases drift uncertainty and/or dwell for Tsec or Ncycles. If still no SV's have been acquired, then step 204 is returned to. If any step is successful, then a handoff is made to a tracking step 212, e.g., TSM.

Alternatively, if the sigmaPos is high confidence, ODSM Ho is tried first with handoff to TSM. If that is successful, only TSM 212 is required. If only 3–4 SV's are acquired, then IDSM is used first. But if 5–6 SV's can be acquired, then IDSM can be avoided. When OD is true, the fastest time-to-acquisition (TimeToACQ) is realized. When ID is true, then TimeToACQ is slower than using steps 204–210 as shown in FIG. 2. If there is no fix after a time-out, ODSM H1 is periodically attempted with expanded frequency uncertainty.

In summary the alternative strategy does ODSM Ho in step 204. One trial uses the same frequency uncertainty model as IDSM Ho. Then IDSM Ho is substituted for step 206 for a certain amount of time (Tsec) and/or a number of cycles (Ncycles). Step 208 substitutes IDSM HoEfd with increased drift uncertainty, and/or increased dwell for Tsec or Ncycles. Lastly, ODSM H1 is used instead in step 210 for Tsec or Ncycles as alternative hypothesis.

Referring to FIG. 2, if the sigmaPos is mid confidence from step 202, e.g., between 150-km and 3000-km, then a step 214 conducts an IDSM Ho. A full pseudorange fix is required, meaning an integer millisecond must be measured for each SV in the fix. The BTT and at least one z-count is needed on each SV. So the signal must be at least −150 dBm, e.g., ID2 or stronger. An algorithm is used to predict integer millisecond on SV's for which only BTT is available and there is at least one SV with a z-count and BTT. The integer millisecond has a bounded range of 63–85 millisecond. The smaller range only occurs for low elevation SV's. Thus, for strong SV's, the range is less than 20-milliseconds. Using SV's with good BTT confidence helps avoid modulo 300-km linearized PR errors that can be caused by BTT noise.

In general, SV's with SNR's better than −150 dBm, OD, ID1 and ID2, can obtain BTT. The Z-count is possible, but unreliable for the case of ID2. However, the z-count can be obtained indirectly using the decoded z-count or a pattern match techniques described in the incorporated-by-reference disclosures mentioned herein.

NAV-data pattern matching is useful for all receivers that try to operate with sensitivity greater than −145 dBm. Because a full pseudorange solution is necessary, the mid-confidence position strategy never attempts a no-z solution. The null hypothesis is more likely to be true than any other, so the most sensitive search given the data on hand is used first.

If a useable ephemeris is available, or models from a server connection can be obtained, then it makes sense to search at a level where data may not be perfectly collected in order to nevertheless get BTT and an integer millisecond. For example from a pattern match.

The start begins with IDSM configured for ID2, e.g., up to −150 dbm. The shorter dwell allows more frequency range to be used in the same amount of time, e.g., IDSM Ho ID2. If this fails, then either the assumed attenuation or the data is wrong. If the frequency window is expanded for a given position uncertainty, then the most likely failure to acquire is the attenuation is more severe than originally assumed. At this point, the dwell could be increased for more sensitivity and still keep the same frequency range.

Therefore, a step 214 uses IDSM Ho, ID3 level in case data is good for Tsec and/or Ncycles. If that fails to acquire, a step 216 tries IDSM HoEf ID3. Then IDSM HoEd ID2 level is tried in a step 218 for Tsec and/or Nycles. A final attempt to acquire in step 220 uses ODSM H1. If step 220 fails, then a return is made to step 214 to try the whole sequence once again.

When there is no confidence in the receiver's position, step 202 hands off to a step 222. A reason no confidence in the position can occur is that data since the last position has simply gotten too old and stale. A check is made in step 222 to see if a server is available that can help supply needed information. If a server is available, a search is made using IDSM HoEf indoor attenuation level-2 (ID2) for Tsec and/or Ncycles. IDSM Ho may also be tried. If that fails, then a search is made with ODSM H1.

In a step 224, there is a complete lack of data, time, or position information. So an Ho hypothesis cannot be produced. The search must go directly to ODSM H1$a$ if there is a complete almanac, otherwise ODSM H1$na$ is used. The difference in searches is significant, searching thirty-two SV's instead of only twenty-four is an increase in effort and time of 25%. Starting directly with ODSM H1 makes sense for reference stations that do not have battery-backed RAM-memory (BBRam). IDSM H1 is useful for a high sensitivity cold start.

A step 226 recognizes a complete lack of prior data, e.g., a cold start. So there are two search options. The first is to run ODSM H1$a$ assuming OD is true. For reference station in cold start, this is preferred. The second option is to run IDSM using a wide frequency window, perhaps with a shorter dwell. Then cycle the SV's through by using small group prePos to search all SV's.

Figure 3:
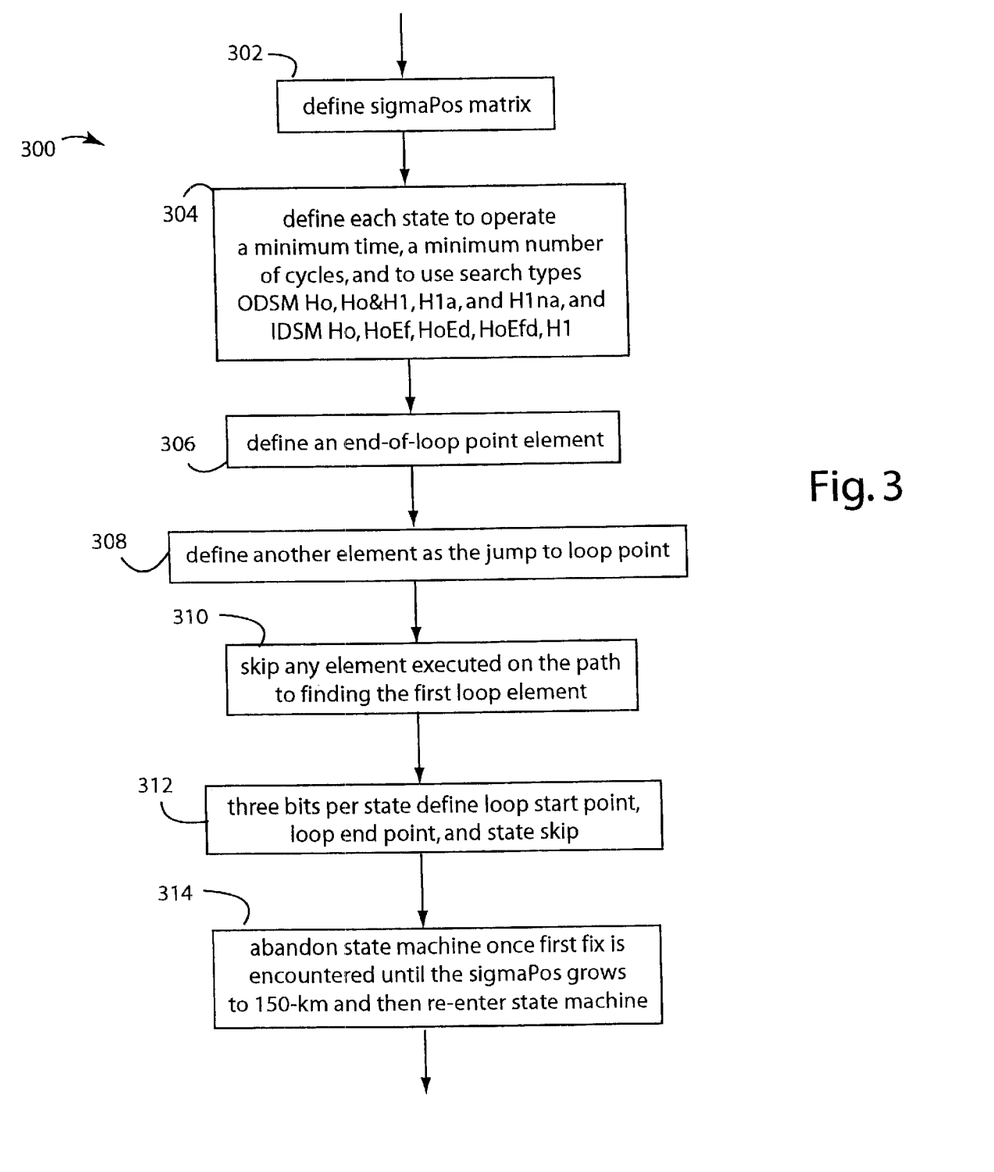
FIG. 3 is a flowchart diagram of a generalized method embodiment of the present invention also useful in the system of FIG. 1.

FIG. 3 represents a general state-machine method embodiment of the present invention, and is referred to herein by the general reference numeral 300. The method 300 works for all clients types including reference stations. In a step 302, a matrix of states is defined for each of the three search types based on the position sigma, (x), e.g., (a) X</=150-km, (b)150-km<X</=3000-km, and (c) X >3000-km. In a step 304, the number and type of search can be defined independently within a search type matrix. The duration of each state can be defined to operate a minimum time period, and a minimum number of cycles. The status is monitored to see which searches have restarted. The types of searches are ODSM: Ho, Ho&H1, H1$a$, H1$na$; and, IDSM: Ho, HoEf, HoEd, HoEfd, H1. In a step 306 one element is defined as the point where looping starts after the state has been reached. This element becomes the end of loop point. In a step 308, another element is defined as the point to jump to start the looping. This element defines the start loop point. In a step 310, any element is skipped in the looping state if it was already executed on the path to finding the first loop element. In a step 312, only 3-bits per state are used to define loop start point, loop end point, and state skip. In a step 314, once the first fix is encountered, that state machine can be abandoned until the position uncertainty grows to 150-km. That state machine is re-entered and re-initialized.

Figure 4:
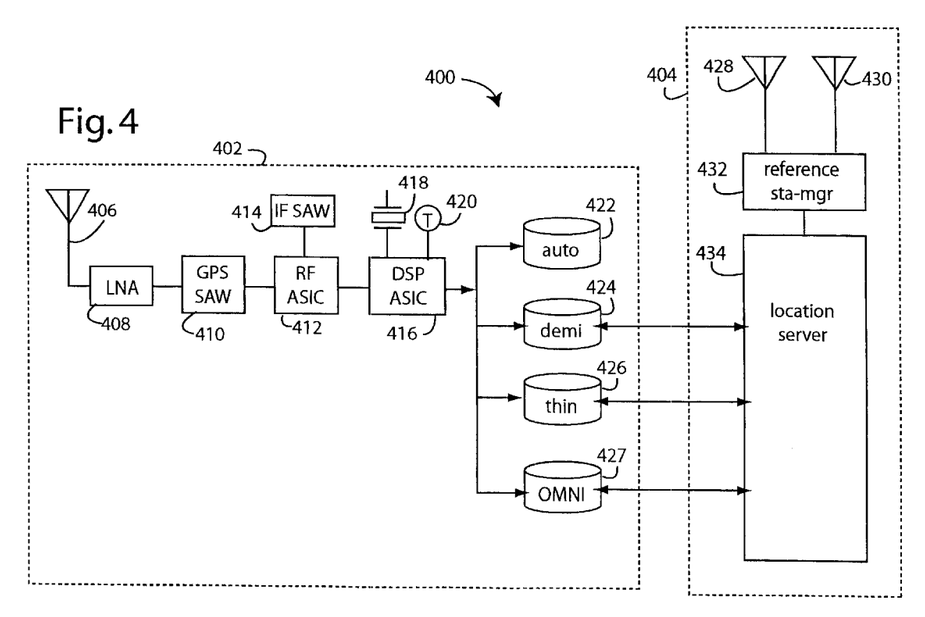
FIG. 4 is a functional block diagram of an auto, demi, thin, and omni-client in a navigation satellite receiver network embodiment of the present invention.

FIG. 4 represents a OMNI-client navigation satellite receiver network embodiment of the present invention, and is referred to herein by the general reference numeral 400. The OMNI-client navigation satellite receiver network includes at least one navigation platform 402 supported by a network server 404.

Each GPS measurement platform 402 typically comprises a GPS antenna 406, a low-noise amplifier (LNA) 408, a GPS surface acoustic wave (SAW) filter 410, a radio frequency (RF) application specific integrated circuit (ASIC) 412 with an intermediate frequency (IF) SAW-filter 414, a digital signal processor (DSP) 416, a reference crystal 418, and a reference-crystal temperature sensor 420.

An autonomous client 422 can function and provide navigation solutions to a user with next to no help from the server 404. A demi-client 424 needs help, e.g., polynomial models that simplify ephemeris and time bias calculations. A thin-client 426 does not burden its local host with navigation solution processing. It lays off just about all the navigation calculations on the server 404, and basically provides only observational measurements from its point of view of the SV constellation. The navigation solutions are returned for local display if a user is there and wants to see them. In a thin-client 426, the DSP is a shared part with some other non-GPS application. As such, multi-threaded application programs are not needed at the client and only simple program loops are executed.

An OMNI client 427 runs almost fully autonomously, but periodically collects a full set of ephemeredes over the computer network. It further operates during power off to keep its position uncertainty, sigmaPos, under 150-km when it is powered back up. These conditions allow high sensitivity operation where much finer search steps are used to find signal power and each step has a long dwell. The OMNI client 427 also benefits greatly if the crystal oscillator 418 is software compensated using temperature measurements by temperature sensor 420. A real time clock is kept running that is accurate to better than one-millisecond of true time each time the navigation platform 402 is powered-up.

The local reference oscillator crystal 418 will have a frequency drift error that will vary as a function of temperature. The reference-crystal temperature sensor 420 is used to measure the temperature of the local reference. oscillator crystal 418. The first use is to collect data to build curve during manufacturing calibration when the navigation platform 402 is initialized and tracking SV's. The subsequent use is to provide an index value so a ninth-order polynomial equation can be computed from stored coefficients while the navigation platform 402 is initializing and trying to lock onto its first SV.

The server 404 typically comprises a number of reference station antennas 428 and 430 that provide GPS signal inputs to a reference station manager 432. A location server 434 can provide support information to the demi-client 424, thin-client 426, and OMNI-client 427 for improved time-to-first-fix and position solution quality. In the case of the OMNI-client 427 operating in high-sensitivity mode, the ephemerid information collected and forwarded by the server 404 enables anywhere fixes with signal levels from SV's under −150 dbm.

A method embodiment of the present invention determines how and when the server 404 is contacted by an OMNI client, e.g., client 104 and navigation platform 402. The server contact must be infrequent and minimized in many situations because the per-byte communication costs are high or the network is only periodically accessible.

When signal strengths are high, the z-count and BTT are really measured by collecting NAV-data. The BTT is used to clean-up any codephase roll-overs. Generally the sub-20 msec portion should agree. There is a bit more noise on the BTT than z-count. However, the z-count can be off by one millisecond for a short period of time near where the codephase rolls over.

The OMNI client needs a good time source to reduce sigmaTime to under one millisecond. The 50-Hz NAV-data can be used to do a pattern match and indirectly find time. Such can provide a GPS receiver with an adequate time source when a z-count cannot be demodulated. If there is enough confidence in the pattern match, the integer millisecond, intMs, on an SV can also be determined.

If the starting time uncertainty, sigmaTime, is greater than ±10 msec, the so-called big delta T term (DT) has to be used in the solution fix. Such increases the number of SV's needed by one. A gridFix method can be used when the position uncertainty, sigmaPos, is under 150-km and the intMs on SV's is not available. A no-Z fix type is used when sigmaTime is greater than 10 msec.

A complete GPS almanac, highAccAlm, is sent by the server with ephemeredes rather than almanacs for all GPS SV's. Another complete GPS almanac, mixAccAlm, can be sent by the server and includes older ephemeredes for SV's it is not currently tracking.

Preferably, a world-wide server (WWserver) is implemented that has continuous observability of the complete GPS constellation. It has enough reference stations with adequate spatial separation to view all SV's around the world at the same time.

Server 404 represents a local area server (LAserver) that has one or more reference stations that observe only a sub-set of the complete GPS SV-constellation. Therefore an LAserver can not provide highAccAlm, only mixAccAlm.

After turning on, the almanac will include ephemeredes that are actually almanacs. After one 12-hour cycle, some of the almanacs will be replaced with ephemeris based almanacs.

The NAV-data from the GPS SV's can be collected directly down to signal levels as low as −145 dbm. Therefore, the ephemeris, z-count and BTT can be derived at this level. SV's at this level can operate independent of the server and also can be used in a fix that has no requirement on starting position accuracy, e.g., anywhere fix. Pattern matching is necessary starting at −145 dbm and can be carried on down to as low as −150 dbm. A z-count or intMs can be thereby obtained so the SV can be used in an anywhere fix. However at such signal levels, the ephemeris needs to be obtained over the network 106 from server 102, or their alternative source. Below signal levels of −150 dbm, the NAV-data is not reliable enough for a pattern match. The NAV-data must be obtained from the server 102 or 404, and the SV's with such weak signals can only participate in a fix when the uncertainty is less than 150-km.

During initial SV acquisition, ephemeris level accuracy is not needed. An almanac, or downgraded ephemeris, is adequate to predict the data needed for preposition. Ephemeris level accuracy is also not needed for fixing. A time-out is defined for the ephemeris age for positioning. Such threshold can be relaxed and still maintain respectable positioning if the accuracy degradation as a function of time is properly modeled. The age threshold can be a controllable parameter so that the customer can select the desired level of performance.

NAV-data subframe data from the server 102 is needed for first fix or setting time. After that, subFrames are no longer requested by client 104. The NAV-data decoded by the client 104 can be sent to the server 102 for the server to do the pattern-matching.

A server connection is not needed by OMNI client 104 when there are three or more SV's with signal levels all better than −145 dbm. The time-to-first-fix (TTFF) will be longer if the ephemeris must be collected. In some cases, previously collected ephemeredes can be used.

A server connection is not needed by OMNI client 104 when previously collected ephemeredes for SV's are on-hand and sigmaPos is less than 150-km. The minimum numbers of SV's needed depends on sigmaTime. Such time uncertainty can be reduced with a real-time clock (RTC) that is software-compensated for temperature drift. So three SV's are needed with such RTC, and four SV's without the RTC.

Otherwise, solving for a fix will require that the OMNI client 104 contact the server 102 and request certain information. The NAV-data subframes are needed when the SV's signals are −145 dbm to −150 dbm and sigmaPos>150-km. The intMs for these SV's is needed for them to participate in the first fix. If only three −145 dbm or weaker SV's are available and no other better means of accurate time, pattern matching can be used. A so-called no-Z fix with four SV's is then used.

The ephemeris has to be requested when SV's signals are not stronger than −145 dbm and their ephemeris has timed out. In such case, the fastest TTFF possible is desired.

A main program application can periodically turn-on the GPS receiver and get a fix. Such decides how far the receiver has moved since the last fix, or decides simply if the GPS receiver has left a predefined zone. The time interval between fixes is selected to keep sigmaPos within 150-km so that the intMs is not needed on weak SV's under −145 dbm. Such extends the ability to retain high sensitivity fixes without needing a server connection to request NAV-data subFrames. The timing of the server requests is adaptive. This is needed to provide a quiet client/server connection when there is adequate performance without it.

The OMNI client must evaluate the data it has, the data's age, and the likelihood of acquisition success, e.g., number of SV's and the signal levels. The OMNI client then decides whether to make the connection and what data to request. The adaptivity can be disabled and the server connection can be made by explicit commands. A master application may decide to make a server connection every one hour. Thus, for fixes done every five minutes, the twelfth one will make a server connection.

A broadcast type ephemeris service can be used where the master application collects the data and then pushes it into the client through generalized API's. The client can be empowered to make a server connection any time during a session.

Some embodiments of the present invention make the client-to-server handshake controllable and selectable. A status message to the master application is sent that indicates (a) the age of ephemeris and whether some SV's in current high-N has timed out, (b) a tracking classification of SV's and whether subframes are needed any SV, and (c) the sigmaTime and sigmaPos.

The indoor, high sensitivity operation can be maintained as long the ephemeredes for SV's being tracked are available, and the position uncertainty is less than 150-km so a fix can be obtained without a z-count. An accurate time source such as a real-time clock (RTC) is preferred because the no-Z fix method increases the number of SV's by one. For example, five SV's for three-dimensional fix, and four SV's for a two-dimensional fix. A position fix can be computed using signal measurements that are otherwise too weak to demodulate the 50 bps GPS Navigation data stream.

A software-compensated crystal oscillator (SCXO) should be included for a reasonable time-to-first fix (TTFF). If TTFF is not so important, the frequency search window can be extended to search out a larger frequency error. If the signals are strong enough to reliably demodulate the data in the receiver, then the position range can extend beyond the 150-km.

The RTC described in the previous United States Patent Applications incorporated herein by reference, can typically maintain a millisecond level accuracy obtained from a previous fix even while the client application is not running. The only cost is a slight increase in the sleeping power consumption.

In embodiments of the present invention, the navigation data can be independently demodulated if the signal is strong enough. Such is not possible in the current STI or Global locate designs unless they also add a conventional tracking capability.

Without a server, high-sensitivity position fixing can only be realized if there has been outdoor like signal recently observed, e.g., within the last four hours. Such is because the visible satellites are constantly changing, and the ephemeris accuracy from previous SV orbits will degrade. The level of degradation for each orbit is an important question. The orbit of the spacecraft as well as the trajectory of the satellite clock both has to be accurately modeled. Some historical modeling could extend the usability of an ephemeris into the 12–16 hour range. Such would improve performance somewhat, but the accuracy of the fix would still be difficult to predict.

Figure 5:
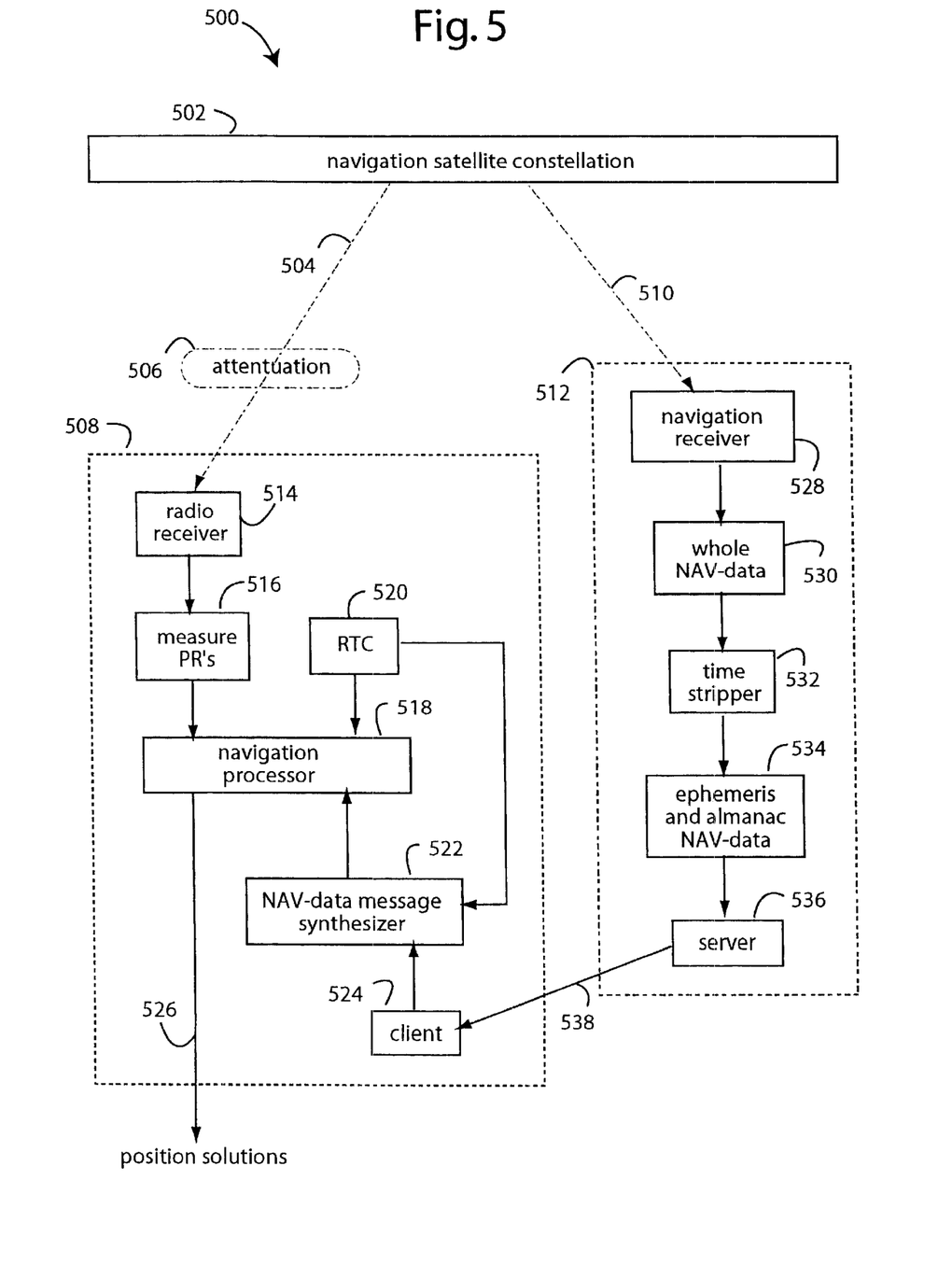
FIG. 5 shows a satellite positioning system receiver and support system embodiment of the present invention wherein a high-sensitivity receiver suffers from signal attenuation that does not affect a server.

FIG. 5 shows a satellite positioning system (SPS) receiver and support system embodiment of the present invention, and is referred to herein by the general reference numeral 500. For example, the Global Positioning System (GPS) operated by the United States Government and the GLONASS system operated by the Russian Government are such SPS systems.

The system 500 receives microwave signal transmissions from an overhead constellation of SPS satellites 502. A signal 504 is reduced in strength during its line-of-sight flight by an attenuation 506, e.g., by a building when indoors. A high-sensitivity SPS receiver 508 nevertheless is able to work with such signal, even though highly attenuated. One consequence of the attenuation is the 50-Hz NAV-data message may not be discernable or reliable. So it may need to be obtained by alternative means in some SPS receivers of the present invention. A full-strength signal 510 is received by a reference station 512, and so it can and does reliably demodulate such 50-Hz NAV-data message. Such reference station 512 may also have a surveyed position which allows it to compare its SPS position solution to its true position. Such comparison will reveal the magnitude and direction of various errors, e.g., ionospheric and tropospheric induced errors.

The pseudoranges can be directly measured by SPS receiver 508 if it already has the NAV-data message information. Such is because code-division multiple access (CDMA) demodulation techniques allow long sample periods to be collected and worked to take advantage of correlation processing gains. A radio receiver 514 tunes to such transmissions and a correlation processor 516 measures the various pseudoranges to the visible satellites.

In one embodiment, a navigation processor 518 gets time information from a real-time clock (RTC) 520 and the z-count, ephemeris, and almanac NAV-data information from a NAV-data synthesizer 522. U.S. patent application Ser. No. 10/079,253, filed Feb. 19, 2002 provides more detail on the construction and use of such an RTC. Otherwise, time, z-count, ephemeris, and almanac NAV-data information are conventionally obtained.

The NAV-data synthesizer 522 reconstructs a suitable 55-frame NAV-data message that would have been received by radio receiver 514 if the attenuation 506 had not been so severe. The remote reference station 512 does not provide time information to the client 524, only current ephemeris and almanac data. Since the communication channel with the remote reference station 512 will typically be much higher bandwidth than 50-Hz, the current ephemeris and almanac data can be transferred in far less time than the normal 12.5 minutes it takes the satellites 502 to transmit it.

A client 524 receives the ephemeris, almanac, NAV-data, and other information. The z-count and timing information is computed by NAV-data synthesizer 522 and by reading the time from RTC 520. The NAV-data synthesizer 522 formats the combined information into a message that the navigation processor 518 can accept and work with naturally.

The RTC 520 is accurate to within three seconds, so the z-count can be correctly written into the synthesized NAV-data and thus avoid integer ambiguities. A position solution output 526 is therefore possible from the navigation processor 518. Such is especially true when combined with the other inventions and technologies developed by the present inventors and already incorporated herein by reference.

The remote reference station 512 comprises its own complete navigation satellite receiver 528 that routinely and continuously tracks the navigation satellite constellation 502. A whole NAV-data message 530 is extracted over the 12.5 message transmission time and then stored in a local memory. A time-stripper 532 removes the timing information, e.g., z-count. An ephemeris and almanac NAV-data 534 is distilled and available to a network server 536. A network or other communication-system connection 538 allows the client 524 to request information that will assist it to initialize and/or to continue computing position solutions.

The communication-system connection 538 may not always be available, so SPS receivers of the present invention are able to operate with infrequent connections to the remote reference station 512.

In a business model embodiment of the present invention, the owner/user of SPS receiver 508 is charged a per-use fee or subscription charge for such NAV-data aiding information by the operator of the remote reference station 512.

As a result, SPS receivers of the present invention are particularly well suited for use indoors and elsewhere where the signal levels drop below −145 dbm.

Receiver initialization method SPS receivers of the present invention include an indoor search method (IDSM) and an outdoor search method (ODSM). The indoor search method processes highly attenuated signals from orbiting SPS satellites that are so weak as to not be of any use to conventional SPS receivers. Each of the indoor search and outdoor search methods are implementable as a search engine embodied in application specific integrated circuits (ASIC) or as programs in microcomputers.

A hand-off mechanism is used to select between the indoor and outdoor methods depending on signal strength, time information, network access, etc. So key parameters are used to define the size of the initialization search of time and frequency. Key attenuation levels are used to define how signal is acquired and tracked in each level.

In order to increase measurement yield, each SV is handed-off to the TSM when it is strong enough to be time-tracked. But it still is kept inside IDSM to provide measurements while the TSM finds the BTT and passes the TSM integrity. For very weak SV's, the frequency loop can sometimes take longer to pull in, or not at all. Thus, both machines operate in parallel to avoid losing any SV's in the transition between tracking state machines.

The time track state machine (TSM) tracks the phase precisely enough to observe the 180-degree carrier phase reversals. The NAV-data is tracked and the z-count can be extracted from the subframes. Such enables a time transfer from the satellite, a golden timing reference.

Ideally, all long term tracking of satellites that are around −145 dbm and stronger is done in the time tracking engine. The benefits of this are the navigation data can be observed and anywhere autonomous positioning capability can be exploited for the client because the total pseudorange can be determined. The TSM uses a high-update rate carrier frequency tracking loop, AFC or PLL, with a phase discriminator that allows observation of the 180-degree phase shifts caused by the NAV-data. The pseudorange is completed by adding the estimated millisecond travel time to the codephase, e.g., by time tagging the received z-count.

Another benefit is the codephase and frequency are averaged. The quantization error are reduced due to receiver processing below the other errors-in-space. Such measurements provide the best accuracy because the phase and frequency are allowed to dither around the true phase. These phases are averaged to produce a measurement whose average phase is quite accurate. The power consumption for each SV is minimized because only one playback is needed per SV and a minimal number of correlators is used.

The TSM has independent inputs and receives prepositioning information directly from the client, or from the other state machines when the auto-upmode, auto-allocation logic is enabled. Auto-upmode is configurable. For thin client there is some benefit from these modes, there is less delay in transferring SV's between machines. The alternative is that the client must monitor success in each message and explicitly control the twelve TSM workspaces based on what signals merit the resources the most.

If there is little confidence in the prior information, the outdoor state machine (ODSM) is used to do a quick search for many satellites. A good estimate of the crystal frequency offset is required, as this sets the center frequency for all searches. High confidence, smaller searches for satellites with very precise frequency and code centers are prepositioned directly in IDSM or TSM depending on the expected signal level.

The ODSM uses one group input message. SV's are defined by setting a bit in one of three 32-bit group words, e.g., high-N, launched, and not-launched.

TABLE

ODSM Characteristics

Searches from 1 to 32 SV's centered around the drift estimate.
Individual prepos can be added by simply adding a packet that sets or clears a bit in one of the 3 SV group words.
By definition, no packet is submitted with more than twelve SV bits set. Such reduces the amount of RAM needed to implement the search.
Additional Doppler centering is provided for the high-N group.
We define a common frequency step size for all groups.
We define a number of frequency steps for high-N group independently from the other two groups.
SV's can be repeated among group words. Such makes sense if we have some prior information for the high-N set and we want to try small well centered searches first.
Each search is a 2 record search. We don't use hypMem.
As for sorting, for the maximum number of verifies, we can use all 8 maxes for each frequency (4 maxes from each 10msec record).
All frequencies are sorted separately.
At the end of the two search records, any sorted maxes are removed that have identical codephase (cell). There is no further same code peak comparison logic to remove maxes.
We also define additional sorting parameters to reduce the number of verifies. Such is useful for the fastest overall search time, but it sacrifices sensitivity.
We also define some additional adaptive parameters that reduce the number of verifies based on the current best verified result.
The verify result is first screened for C3. If that passes, then the screened top power is saved as the best verify result.
After the complete verify is finished, the remaining best verify is the winner.
The overall top verified power is saved in the case that the C3 screening accidentally removes a strong power. If the overall top verify power does not agree with the screened verify winner, then we re-verify the overall top max and then take the best.
If a power is encountered above an earlyTermination threshold, then the search for that SV is considered finished, and we save that result as the measurement for that SV. Such power does not need to be verified.
An earlyVerifyTermination threshold is defined so that if the search power maxes are a specified level below the current top verified max, then those search maxes are not added to the verify list.
Another threshold is defined so that if the power is above this threshold, then only this max is added to the verify list.
Typical frequency search range is ±5kHz with a good drift estimate from an individual SCXO model. Search time per SV is then 0.01sec(per PDI) * 2 (10msec PDI's) * 100 (freq)/20 freq per 10msec = 0.1sec. Two records account for the NAV-data, and 100/20 records since 100 frequencies search 20 frequencies per record.
A Doppler estimate is included for the high-N set. Thus, if we have high confidence in the prior data, the search can be reduced and thus can be sped up.
Status can be configured to from 1Hz or to be output at the end of each group word and also at the end of verify.
Auto-upmode can prepos into TSM and IDSM according to two thresholds. SV's that pass verify can auto-upmode to TSM if the verify power is above a TSM input threshold. Similarly, SV's that did not auto-upmode to TSM that pass a second and most likely weaker threshold can auto-upmode to IDSM.
Auto-restart logic will automatically restart the engine when all SV's have either searched the complete frequency range or auto-upmoded so that there are no more SV's needing a frequency search.
SV's can only auto-upmode into other state machines if there are slots available. If space is available, then the workspace will be generated by the firmware logic. Thus, the navigation platform needs to monitor the workspace allocation.
If the SV was not able to auto-upmode, the navigation platform will monitor the relative signal strengths and make space in the appropriate engine by removing a weaker or searching SV to make space for the stronger un-allocated SV.
By disabling auto-upmode, the engine can be used as a kind of integrity machine that continues to search for large power on the SV. Such is needed in the urban canyon where is it likely that a tracking state machine will continue to track a reflection that is far from the true code peak (because the TABLE-continued ODSM Characteristics reflection source is very far from the antenna) even though the direct beam has become visible again. Thus, it is critical that the status message provides a method to differentiate the search peak from the tracking peak.

The outdoor acquisition engine generates four modes in the client code with different values of the ODSM prePos parameters. For example, with an OD SNR hypothesis of SNR at least −142 dBm, the position uncertainty hypotheses can be, Ho: Position error<150-km, small time error so that Dopplers are correct, H1: Ho is wrong.

Four types of searches can be made, Ho, Ho & H1, H1a, and H1na. The Ho high confidence single hypothesis uses a ±2 kHz freq search, with high-8 only, Doppler and SCXO centered. It is tuned for highest sensitivity and uses the high-N group word only.

For Ho&H1, there is still some confidence in H0, but H1 is also tried. It uses ±2 kHz with high-8 Doppler and SCXO centered, tuned for medium sensitivity. It searches all twenty-four of the other SV's, the high-8, and uses a full ±4 kHz spread among the launched and not-launched group words. The high-N can also be searched with the same wide frequency window without including these SV's in the other words. At least the high-N is tried first, but it is a waste of time to try them again.

For H1a the time or position is not known. The current launched SV's are known from the almanac. The twenty-four are spread among three group words. Some knowledge of orbit plane may be useful for optimal anywhere-search time.

The H1na is the same as H1a, but with no almanac available. This occurs in an autonomous client with no battery-backed memory.

Each of the search parameters can be tuned for high sensitivity or fast-time-to-completion.

The ODSM measurements are handed-off to the TSM for tracking. The OD mode can operate quite well in ODSM and TSM. There may be certain cases with mixed SNRS, weaker SV's are acquired in IDSM while tracking stronger SV's in TSM. Such is true for the general client.

The IDSM firmware directs the digital signal processor to do very long integrations for each requested codephase and frequency hypothesis.

The IDSM has two inputs, a group packet and an individual prepos. Reception of a group prepos completely resets the state machine. Individual prepos can take an empty slot or overwrite the same SV. If the SV is tracking, the prepos can be ignored if it is not forced. The prepos can be either a search with full code window and a specified number of frequencies, or a one weakMeas window with fifteen frequencies just like is used with the indoor measurement machine The same size search window applies to all SV's in the group input packet. The integration, or dwell time, is the same for each SV. Strong SV's will finish early when the observed power exceeds a threshold. The search range is also generalized, it will search up to 256 frequency steps per SV. Strong SV's can be upmoded to timeTrack if that is allowed. Weak meas tracking has non-equal spacing to put more filters at the best frequency estimate but also cover the range needed to do the sync-function integrity.

Indoor search methods can be used if there is some key GPS information available that can be relied upon. E.g., the position error is less than about 200-km, and the GPS time error is less than ten seconds. But, with time and position uncertainty this high, full code searches are a necessity. And for this amount of code, the search digital signal processor mode must be used that creates code in $31/64^{th}$ chip intervals.

The current GPS data is used to compute the satellite position and velocity. The satellite Doppler can be predicted with an error of 1.14e-4 m/s per meter of position error.

Thus, for 100 km, the maximum range-rate error is 11.4 m/s, about 60 Hz.

The uncertainty in the reference crystal oscillator must be accounted for, e.g., 27.456 MHz crystal. Assuming a precise individual model for each crystal, the SCXO model, exists that has an accuracy around 0.5 ppm. At L1, 1575.42 Mz, half a part-per-million is 788 Hz.

Some user dynamics must be accounted for, but these effects are usually much less significant than the crystal oscillator uncertainty. A vehicle moving at 100 mph (160 kph) produces 45 m/s=236 Hz. Compare this to the worst case frequency error of 788+60+236=1084 Hz.

Using a rule of thumb that assumes the crystal oscillator uncertainty is 0.5 PPM, the receiver must search ±1 kH for each SV in indoor mode, even though this is 10% short of the model. From one viewpoint, the probability is quite small that the combination of the vehicle motion and the Doppler error would have the same sign for all SV's.

The indoor search and tracking state machine searches an arbitrary frequency window for eight SV's in parallel and with long integration times. Searches can be ±1 kHz, or larger if the longer time it takes is acceptable. Wider searches in IDSM can use a shorter dwell.

Where the position uncertainty is higher than 150-km and where a shorter dwell with degraded sensitivity is used, the BTT and a z-count on each SV are needed to do a full pseudorange. A shorter dwell can generally acquire SV's up to ID2 (−150 dBm). But if not, the dwell can be increased to improve SV acquisition.

Six types of IDSM searches are useful. The IDSM Ho search is the normal IDSM with the smallest reasonable frequency window and the longest reasonable dwell. Such is generally used when good prior data is on-hand. The IDSM HoEf search extends the frequency window when the crystal uncertainty model has been too optimistic. The IDSM HoEd search extends the dwell because the attenuation level is more severe than was first anticipated and more receiver sensitivity is needed. The IDSM HoEfd search extends both the frequency and dwell. The IDSM HoEfRd search increases the frequency range, but reduces the dwell when there is less confidence in the data or when not connecting to the server. Without the ephemeris, there is no value in searching with very long dwell since SV's cannot be used for which NAV-data cannot be collected.

The IDSM H1 search is a backup for improving receiver sensitivity when the ODSM H1 search is not acquiring. A larger frequency window is used with a shorter dwell. For each factor of two reduction in dwell, the search can double the frequency window. For example, going from one second to 250-millisecond, 3 db is given up from −153 dbm to get to −150 dbm. A 4 kHz window can be searched in the same time a 1 kHz window is searched with a one second dwell. Such is a natural level since this is the limit of where BTT can be found. However, we cannot also get NAV-data here. So reducing the dwell further to 80-millisecond, takes us to −148.5 dBm and the extra factor of two can be used to search faster. The IDSM H1 search requires the client to monitor the IDSM status and determine when it has completed the window for all eight SV's. Another set of SV's must be submitted for slots that did not acquire, and repeated until all twenty-four or thirty-two SV's are completed.

There are three basic levels of received signal strength, e.g., (1) better than −145 dbm, (2) between −145 dbm and 150 dbm, and (3) weaker than −150 dbm. With a received signal strength better than −145 dbm, the NAV-data can be reliably collected and the ephemeris, z-count, and bit transition time (BTT) extracted. With a received signal strength between −145 dbm and 150 dbm, the NAV-data is just strong enough to do pattern matching if a good copy is available to match. Such pattern matching will allow the z-count and integer millisecond to be determined, and thus allow the particular satellite vehicle to be used in an "anywhere" fix. However, in such case the ephemeris information must be obtained from a third-party source because it cannot be received reliably locally with such a weak signal. If the received signal strength is weaker than −150 dbm, the position uncertainty must be less than 150-km and the NAV-data must be contributed from a third-party source, e.g., a network server.

For a frequency uncertainty model, the search frequencies to use are a combination of the expected Doppler plus the effects of user velocity and the error in the drift model.

```
FreqUnc = SigmaDriftError + sigmaSvDoppler + Velocity of Vehicle
        = function of source and model + 1.1e-4 m/s* posError(m) * 10e-3 + maxVel
        = function of source and model + 1.1e-4 m/s * posError(m) * 10e-3 + maxVel
        = SCXO model error + .6Hz * posError(km) + mavVel
```

The sigmaSvDoppler term accounts for the error induced in Doppler error caused by the error in the direction cosines from position error. Typical values of frequency error as function of position error, 10 km=6 Hz, 100 km=60 Hz, 150-km=90 Hz, 300 km=180 Hz, 600km=360 Hz, 3000-km=1800 Hz about the halfway point where the Doppler error is half total search, and 6,000 km=3600 Hz which is the worst case with one SV average SV position. For 200 km vehicle, max velocity=380 Hz. A crystal model better than a 0.5 ppm leads to 750 Hz. When the position error is less than 150-km, a ±1 kHz frequency window is adequate. With no idea of position or time, a ±4 kHz frequency search is needed to cope with the SV-Doppler sigma.

Ideally, all long term tracking of satellites that are around −145 dbm and stronger is done with the time tracking engine. Such method can observe the navigation data and thus, exploit any-where autonomous positioning capability for client because the method can determine total pseudorange. TSM uses a high-update rate carrier frequency tracking loop (AFC or PLL) with a phase discriminator that allows us to observe the 180-degree phase shifts caused by the NAV-data. The pseudorange is completed by adding the estimated millisecond travel time to the codephase by time tagging the received z-count.

The codephase and frequency are averaged and thus, the method can reduce the quantization error due to receiver processing below the other errors-in-space. Thus, the measurements should provide the best accuracy. Such is because the method allow the phase and frequency to dither around the true phase, and the method average these phases to produce a measurement whose average phase is quite accurate.

The power consumption per SV is minimized because the method only need one playback per SV and the method use the minimal number of correlators.

Although the present invention has been described in terms of the presently preferred SPS receivers, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A method for operating a navigation receiver, the method comprising the steps of:

categorizing a position uncertainty (sigmaPos) of a navigation satellite receiver into a category-A where there is no integer ambiguity problem to solve, a category-B where a useful Doppler estimate can be applied, and a category-C where the position is so uncertain that an initial Doppler estimate of zero produces a quicker position solution result;

obtaining satellite vehicle (SV) ephemeris, almanac, and system time information other than directly from an orbiting SV according to which of said three categories A–C said sigmaPos is assumed to fit; and acquiring a microwave signal transmissions directly from said orbiting SV according to which of said three categories A–C said sigmaPos is assumed to fit.

2. The method of claim 1, if the step of categorizing results in said category-A sigmaPos, then further comprising the step of:

finding a position fix without first obtaining a bit transition time (BTT) or z-count on each SV.

3. The method of claim 1, if the step of categorizing results in said category-B sigmaPos, then further comprising the step of:

finding a position fix by predicting the expected Doppler on any high-N SV.

4. The method of claim 1, if the step of categorizing results in said category-C sigmaPos, then further comprising the step of:

finding a position fix by assuming no position at all.

5. The method of claim 1, wherein the step of acquiring further includes the step of:

reducing any initial time uncertainty by reading a local real time clock.

6. The method of claim 1, wherein the step of acquiring or obtaining further includes the step of:

reducing any initial time uncertainty by obtaining a z-count to any SV by decoding a navData message.

7. The method of claim 1, wherein the step of obtaining further includes the step of:

reducing any initial time uncertainty by obtaining a z-count to any SV by pattern matching from data provided by a network server.

8. The method of claim 1, wherein the step of obtaining further includes the step of:

reducing any initial time uncertainty by obtaining a time estimate provided by a network server that includes a network latency computation.

9. The method of claim 1, wherein the step of acquiring further includes the step of:

searching for signals from SV's according to attenuation levels that depend on assumptions of outdoor and indoor operation.

10. The method of claim 1, wherein the step of acquiring further includes the steps of:

using an outdoor search method (ODSM) to search for signals from SV's if an attenuation level is such that a received signal-to-noise ratio (SNR) is stronger than approximately −142 dBm; and gathering reliable navData without using an indoor search method (IDSM).

11. The method of claim 1, wherein the step of acquiring further includes the steps of:

using an indoor search method (IDSM) to search for signals from SV's if an attenuation level is such that a received signal-to-noise ratio (SNR) is weaker than about −142 dBm; and receiving at least some navData indirectly with the assistance of a server.

12. A navigation satellite receiver network, comprising:

a GPS measurement platform for receiving signals from orbiting GPS satellites and for providing navigation fixes from such signals;

a network server for receiving signals from orbiting GPS satellites and for providing navigation information from such signals over a network to assist the GPS measurement platform in providing said navigation fixes;

a first processor included in said GPS measurement platform for categorizing a position uncertainty (sigmaPos) into one of three categories including a first sigmaPos of less than about 150-km, a second sigmaPos of between 150-km and 3000-km, and a third sigmaPos of greater than 3000-km; and a second processor included in said GPS measurement platform for acquiring signal from said orbiting GPS satellites according to which of said three categories sigmaPos fits.

13. A satellite positioning system (SPS) receiver and support system, comprising:

a high-sensitivity SPS receiver for receiving signals from orbiting GPS satellites that have been attenuated and for providing navigation fixes from such signals;

a reference station for receiving signals from orbiting GPS satellites and for providing navigation information from such signals to assist the high-sensitivity SPS receiver in providing said navigation fixes;

a NAV-data synthesizer included in the high-sensitivity SPS receiver for reconstructing NAV-data messages with said provided navigation information from said orbiting GPS satellites that have been too highly attenuated to be obtained directly;

a first processor included in said GPS measurement platform for categorizing a position uncertainty (sigmaPos) into one of three categories including a first sigmaPos of less than about 150-km, a second sigmaPos of between 150-km and 3000-km, and a third sigmaPos of greater than 3000-km; and a second processor included in said GPS measurement platform for acquiring signal from said orbiting GPS satellites according to which of said three categories sigmaPos fits.

14. A method for operating a satellite positioning system (SPS) receiver, the method comprising the steps of:

categorizing the position,uncertainty (sigmaPos) of a navigation satellite receiver into one of three categories including a first sigmaPos of less than about 150-km, a second sigmaPos of between 150-km and 3000-km, and a third sigmaPos of greater than 3000-km; and acquiring signal from satellite vehicle (SV) transmissions according to which of said three categories sigmaPos fits.

15. The method of claim 14, if the step of categorizing results in said first sigmaPos, then further comprising the steps of:

finding a position fix without first obtaining a bit transition time (BTT) or z-count on each SV.

16. The method of claim 14, if the step of categorizing results in said second sigmaPos, then further comprising the steps of:

finding a position fix by predicting the expected Doppler on each high-N SV.

17. The method of claim 14, if the step of categorizing results in said third sigmaPos, then further comprising the steps of:

finding a position fix by assuming no position at all.

18. The method of claim 14, wherein the step of acquiring further includes the steps of:

reducing any initial time uncertainty by reading a local real time clock.

19. The method of claim 14, wherein the step of acquiring further includes the steps of:

reducing any initial time uncertainty by obtaining a z-count to any SV by decoding a navData message.

20. The method of claim 14, wherein the step of acquiring further includes the steps of:

reducing any initial time uncertainty by obtaining a z-count to any SV by pattern matching from data provided by a server.

21. The method of claim 14, wherein the step of acquiring further includes the steps of:

reducing any initial time uncertainty by obtaining a time estimate provided by a network server that includes a network latency computation.

22. The method of claim 14, wherein the step of acquiring further includes the steps of:

searching for signals from SV's according to attenuation levels that depend on outdoor and indoor operation.

23. The method of claim 14, wherein the step of acquiring further includes the steps of:

using an outdoor search method (ODSM) to search for signals from SV's if an attenuation level is such that a received signal-to-noise ratio (SNR) is stronger than about −142 dBm; and obtaining reliable navData without using an indoor search method (IDSM).

24. The method of claim 14, wherein the step of acquiring further includes the steps of:

using an indoor search method (IDSM) to search for signals from SV's if an attenuation level is such that a received signal-to-noise ratio (SYR) is weaker than about −142 dBm; and obtaining at least some navData indirectly with the assistance of a server.

* * * * *

UNITED STATES PATENT AND TRADEMARK OFFICE
CERTIFICATE OF CORRECTION

PATENT NO.   : 6,683,564 B1
DATED        : January 27, 2004
INVENTOR(S)  : Paul W. McBurney It is certified that error appears in the above-identified patent and that said Letters Patent is hereby corrected as shown below:

<u>Column 24,</u>
Line 1, please change "position,uncertainty" to -- position uncertainty --.

Signed and Sealed this

Eleventh Day of May, 2004

JON W. DUDAS
*Acting Director of the United States Patent and Trademark Office*